(12) United States Patent
Schwarz et al.

(10) Patent No.: US 9,731,694 B2
(45) Date of Patent: Aug. 15, 2017

(54) ELECTROMECHANICAL BRAKE BOOSTER FOR A BRAKE SYSTEM OF A VEHICLE, AND METHOD FOR INSTALLING AN ELECTROMECHANICAL BRAKE BOOSTER ON AND/OR IN A BRAKE SYSTEM FOR A VEHICLE

(71) Applicant: Robert Bosch GmbH, Stuttgart (DE)

(72) Inventors: Rainer Schwarz, Immenstadt (DE); Harald Guggenmos, Immenstadt/Seifen (DE); Christoph Voelkel, Waltenhofen (DE)

(73) Assignee: Robert Bosch GMBH, Stuttgart (DE)

( * ) Notice: Subject to any disclaimer, the term of this patent is extended or adjusted under 35 U.S.C. 154(b) by 0 days.

(21) Appl. No.: 14/914,965

(22) PCT Filed: Jul. 28, 2014

(86) PCT No.: PCT/EP2014/066128
§ 371 (c)(1),
(2) Date: Feb. 26, 2016

(87) PCT Pub. No.: WO2015/028220
PCT Pub. Date: Mar. 5, 2015

(65) Prior Publication Data
US 2016/0207516 A1    Jul. 21, 2016

(30) Foreign Application Priority Data
Sep. 2, 2013   (DE) ................. 10 2013 217 443

(51) Int. Cl.
*B60T 13/74*    (2006.01)
(52) U.S. Cl.
CPC .......... *B60T 13/745* (2013.01); *B60T 13/746* (2013.01)

(58) Field of Classification Search
CPC ..... B60T 1/10; B60T 7/04; B60T 7/06; B60T 7/042; B60T 8/172; B60T 8/341;
(Continued)

(56) References Cited

U.S. PATENT DOCUMENTS 4,650,363 A      3/1987   Kehl et al.
6,652,040 B2 *  11/2003   Oka .................... B60T 11/10
                                                     303/114.1
(Continued)

FOREIGN PATENT DOCUMENTS

FR          2 947 228        12/2010
WO     WO 2010/069656       6/2010

OTHER PUBLICATIONS

International Search Report for PCT/EP2014/066128, dated Jul. 31, 2014.

*Primary Examiner* — Bradley King
*Assistant Examiner* — San Aung
(74) *Attorney, Agent, or Firm* — Norton Rose Fulbright US LLP; Gerard Messina

(57) ABSTRACT

An electromechanical brake booster for a brake system of a vehicle includes: a booster housing; and a valve element, which is situated in a continuous receiving opening of the booster housing in a manner that allows an adjustment in relation to the booster housing, and which has a continuous central opening within which a valve piston is positioned or able to be positioned in a manner that allows an adjustment in relation to the valve element such that a driver-applied brake force is transmittable via an input rod to an output rod. In addition, a ball segment is situated or developed on the valve element, which contacts a conical seat of a disk of the electromechanical brake booster situated between the ball segment and the booster housing so as to allow an adjustment in relation to the booster housing.

9 Claims, 1 Drawing Sheet

(58) Field of Classification Search
CPC .... B60T 8/3275; B60T 8/4077; B60T 8/4081;
B60T 8/4225; B60T 8/5031; B60T
8/5068; B60T 11/18; B60T 13/12; B60T
13/46; B60T 13/66; B60T 13/74; B60T
13/662; B60T 13/686; B60T 13/743;
B60T 13/745; B60T 13/575; B60T
2201/03; F16K 1/34; F16K 1/36; F16K
1/42
USPC .............................. 303/115.1; 251/333, 334
See application file for complete search history.

(56) References Cited

U.S. PATENT DOCUMENTS

2011/0248557 A1* 10/2011 Overzier .................... B60T 1/10
303/3
2011/0253490 A1* 10/2011 Vollert .................. B60T 13/745
188/156
2011/0297493 A1* 12/2011 Vollert .................... B60T 7/042
188/106 R
2013/0047593 A1* 2/2013 Weiberle .................. B60T 1/10
60/327

* cited by examiner

ELECTROMECHANICAL BRAKE BOOSTER FOR A BRAKE SYSTEM OF A VEHICLE, AND METHOD FOR INSTALLING AN ELECTROMECHANICAL BRAKE BOOSTER ON AND/OR IN A BRAKE SYSTEM FOR A VEHICLE

BACKGROUND OF THE INVENTION

1. Field of the Invention

The present invention relates to an electromechanical brake booster for a brake system of a vehicle. It also relates to a brake system. Moreover, the present invention relates to a method for installing an electromechanical brake booster on and/or in a brake system for a vehicle.

2. Description of the Related Art

A brake system having an electromechanical brake booster is described in the French patent FR 2,947,228 A1. The electromechanical brake booster includes a booster housing which is adjustable with the aid of an electric motor and has a continuous receiving opening for a valve element situated therein in an adjustable manner, which can be adjusted together with the booster housing. Moreover, the valve element has a continuous central opening, within which a valve piston is adjustable in relation to the valve element by a driver-applied brake force that is transmitted thereto. The adjustment movements of the valve element and/or the valve piston may be used for adjusting an output piston in such a way that a brake pressure prevailing in at least one pressure chamber of a master brake cylinder is able to be increased.

BRIEF SUMMARY OF THE INVENTION

The present invention creates an electromechanical brake booster for a brake system of a vehicle, a brake system, and a method for installing an electromechanical brake booster on and/or in a brake system for a vehicle.

Since the electromechanical brake booster is equipped with the ball segment which is in contact with the conical seat of the disk, tolerance-related tilting of the electromechanical brake booster installed on/in the brake system is able to be (automatically) compensated. Even if the electromechanical brake booster exhibits relatively significant tilting, it is possible in this case to still use a force provided by an operation of a motor of the electromechanical brake booster for increasing a brake pressure. Despite the relatively significant tilted state of the electromechanical brake booster, excellent adjustability of the valve piston with the aid of the driver-applied brake force transmitted thereto is still able to be ensured. Overall, it can be said that the present invention makes it possible to use the electromechanical brake booster to advantage even if this brake booster exhibits fairly serious tilting.

Because a tolerance-related tilted state of the installed electromechanical brake booster is able to be compensated in a reliable and relatively easy manner in the present invention, no particular care must be taken during the installation. As a result, the present invention contributes to the simplification of an electromechanical brake booster installation.

In one advantageous specific embodiment, the valve element includes a step between a first subsection that may be situated in the continuous receiving bore and a second subsection that projects from the continuous receiving bore in the direction of the output rod, the ball segment being situated or developed on a surface of the step facing away from the output rod. A possible tilted position of the electromechanical brake booster caused by tolerances can thus be reliably compensated by a radial movement of the disk.

The disk is preferably situated within a receiving bore formed on the booster housing. No undesired slipping of the disk is therefore to be expected.

The valve element and the ball segment, for instance, may be developed in one piece, which saves a working step for providing a separately produced ball segment on the valve element. However, it is pointed out that the present invention is realizable also when using a ball segment that is produced separately from the valve element.

In one further advantageous specific embodiment, the electromechanical brake booster includes as output rod a rigid output rod, so that it is possible to use a relatively cost-effective output rod for the electromechanical brake booster.

In particular, this dispenses with the usual need of installing a more complex output rod equipped with a compensation element for compensating a tilted state on an electromechanical brake booster. When the electromechanical brake booster is active, no undesired transverse force caused by the tilted-state compensation element of the more complex output rod has therefore to be expected.

The ball segment may advantageously be made from plastic, and/or the disk from plastic and/or steel. Plastic extrusion components, in particular, can be used for the ball segment and/or the disk. The ball segment and the disk thus are easily formed and produced. Especially the ball segment can be extruded onto the valve element in an uncomplicated manner.

The valve element preferably has at least one indentation on its outer surface pointing toward the booster housing, which is guided along a guide situated at the continuous receiving opening of the booster housing. The at least one indentation and the guide in particular are able to be developed in a first region of the electromechanical brake booster, which is able to be fixed in place so that it faces the input rod; the continuous receiving opening of the booster housing exhibits play between the booster housing and the valve element in a second region of the electromechanical brake booster, which is able to be fixed in place so that it faces the output rod. The thereby realizable free mobility of the part of the booster housing lying in the second region radially with respect to the valve element or the part of the booster housing lying in the second region radially with respect to the booster housing enables an advantageous compensatory movement to compensate even a relatively significant tolerance-related tilted position.

The aforementioned advantages are ensured also in a brake system having an electromechanical brake booster of this type.

A corresponding method for installing an electromechanical brake booster on and/or in a brake system for a vehicle likewise realizes the afore-described advantages. It is pointed out that the method according to the specific embodiments of the electromechanical brake booster of the invention can be developed further.

DETAILED DESCRIPTION OF THE INVENTION

Figure 1:
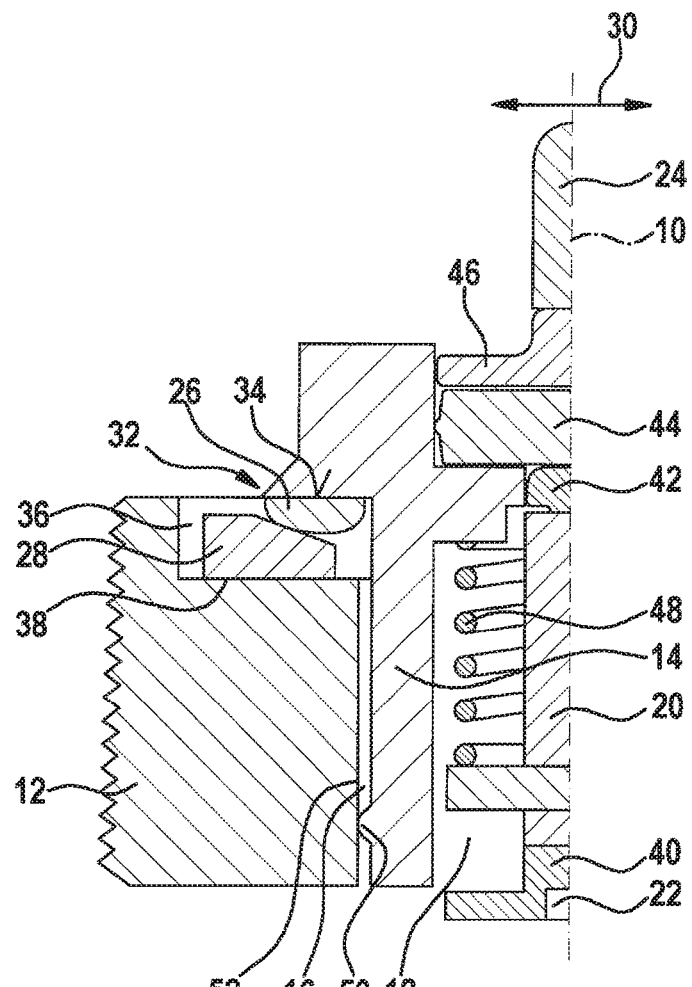
FIG. 1 shows a schematic partial view of one specific embodiment of the electromechanical brake booster.

FIG. 1 shows a schematic partial view of one specific embodiment of the electromechanical brake booster.

The electromechanical brake booster schematically shown in part in FIG. 1 is able to be used on and/or in a brake system of a vehicle. It is pointed out that the usability of the electromechanical brake booster is not limited to a particular brake system type, in particular not to a specific development of the master brake cylinder, of the at least one brake circuit or the brake actuating element/brake pedal.

The electromechanical brake booster partially shown in FIG. 1 has a rotation-symmetric design with respect to its braking axis 10 (e.g., center longitudinal axis). However, the rotationally symmetric development of the electromechanical brake booster is meant to constitute merely an example. The electromechanical brake booster includes a booster housing 12 and a valve element 14, which is disposed in a continuous receiving bore 16 of booster housing 12 so as to be adjustable in relation to booster housing 12. Valve element 14 has a continuous central opening 18, within which a valve piston 20 of the electromechanical brake booster is situated or in which a valve piston 20 which cooperates with the electromechanical brake booster may be placed.

Valve piston 20 is adjustable in relation to valve element 14 with the aid of a driver-applied brake force. Toward this end, an input rod 22 of the electromechanical brake booster is disposed directly or indirectly at a first end of valve piston 20, or an input rod 22, which cooperates with the electromechanical brake booster, can be placed there. When input rod 22 is moving along braking axis 10 in a braking direction, the driver-applied brake force is transmittable to valve piston 20 in such a way that valve piston 20 is adjustable as well. In addition, an output rod 24 of the electromechanical brake booster is disposed directly or indirectly at a second end of valve piston 20, or it is possible to place an output rod 24 there, which cooperates with the electromechanical brake booster, to which the driver-applied brake force is transmittable. In addition, booster housing 12 is adjustable (essentially along braking axis 10) at least in the braking direction with the aid of a motor (of the brake booster or an external motor) linked directly or indirectly thereto. In this way valve element 14, which is at least intermittently contacted by booster housing 12, is adjustable, as well. An adjustment motion of the valve element along braking axis 10 in the braking direction induced in this manner may trigger an additional adjustment movement of output rod 24. The adjustment movement brought about by the driver-applied brake force and/or the motor may result in an increase in a brake pressure in a master brake cylinder (not shown) situated directly or indirectly on output rod 24. The electromechanical brake booster of FIG. 1 therefore carries out at least the tasks of a conventional brake booster. Since a multitude of control strategies are able to be carried out for the motor of the electromechanical brake booster, no further discussion relating to them will be undertaken here.

In addition, a ball segment 26 is situated or formed on valve element 14. Ball segment 26 contacts a conical seat of a disk 28 of the electromechanical brake booster, which is situated between ball segment 26 and booster housing 12 in a manner that allows an adjustment in relation to ball segment 26 and booster housing 12. In particular, disk 28 disposed between ball segment 26 and booster housing 12 may be radially displaceable in relation to braking axis 10. This means that disk 28 is displaceable in a direction that is (essentially) aligned at a right angle to braking axis 10. Such an adjustment motion of disk 28 causes a sliding movement of ball segment 26 on the conical seat, which frequently leads to the tilting motion (schematically represented by arrow 30) of valve element 14, valve piston 20, and/or output rod 24 in relation to booster housing 12. In this way a tolerance-related tilted state of booster housing 12 is able to be compensated in all directions and an ideal alignment of valve element 14, valve piston 20, and/or output rod 24 in relation to the master brake cylinder and booster housing 12 is achievable. The electromechanical brake booster schematically represented in FIG. 1 thus induces the advantageous compensating movement for compensating even a relatively significant tilted state of the electromechanical brake booster, which increases the potential uses of the electromechanical brake booster and reduces the required work in connection with its installation.

In the specific embodiment of FIG. 1, the valve element has a step 32 between a first subsection that can be placed in continuous receiving opening 16 and a second subsection that projects from continuous receiving opening 16. Ball segment 26 is situated or developed on a surface 34 of step 32 that faces away from output rod 24. In the specific embodiment of FIG. 1, ball segment 26 is a component which is produced separately from valve element 14, but as an alternative, valve element 14 and ball segment 26 may also be developed in an integral fashion. As a result, ball segment 26 is able to be developed in an uncomplicated manner in a preferred installation position on valve element 14. A working step for placing ball segment 26 in this preferred installation position is therefore able to be omitted.

As illustrated in FIG. 1, disk 28 provided with the conical seat may be situated within a receiving bore 36 formed in booster housing 12. A rear side 38 of disk 28 facing away from the conical seat in particular may contact a bottom surface of receiving bore 36. Undesired slippage of disk 28 out of the electromechanical brake booster is able to be prevented in a reliable manner by this kind of placement of disk 28.

Ball segment 26 (or valve element 14 with ball segment 26) and disk 28 are preferably made from plastic. Elements 26 and 28 may thus be produced with the aid of an easily executed and cost-effective injection molding method. As an alternative, however, disk 28 may also be made from steel.

In the specific embodiment of FIG. 1, the electromechanical brake booster has as additional elements also an input rod seat 40, a papilla 42, a reaction disk 44, an output rod base 46, and a spring 48, by which valve piston 20 is braced on valve element 14. Input rod seat 40 is situated between the only partially illustrated input rod 22 and valve piston 20. Via papilla 42, reaction disk 44, and output rod base 46, the driver-applied brake force is transmitted via valve piston 20 to output rod 24. It is pointed out, however, that equipping the electromechanical brake booster with elements 40 to 48 is to be understood merely as an example.

The electromechanical brake booster has a rigid output rod 24 as output rod 24. Because of the advantageous possibility of compensating tolerance-related tilted positions of the electromechanical brake booster, output rod 24 need not be provided with a tilted-position compensation element or be given a flexible design. Instead, a cost-effective rigid output rod 24 can be used for the electromechanical brake booster. The rigid design of output rod 24 is also advantageous insofar as no transverse forces arise during an operation of the electromechanical brake booster, which would have to be tolerated in a development that includes a tilted-position compensation element.

The electromechanical brake booster of FIG. 1 advantageously also includes a valve element 14, which has at least one indentation 50 at its outer surface facing in the direction of booster housing 12. In the specific embodiment of FIG. 1, indentation 50 is a circular ring segment. Such a development of the at least one indentation 50 merely constitutes an example, however. The at least one indentation 50 is guided along a guide 52 situated at the continuous receiving opening 16 of booster housing 12. Guide 52, for example, may be at least one contact surface of the at least one indentation 50 and/or at least one guide groove. The at least one indentation 50 and guide 52 are advantageously developed in a first region of the electromechanical brake booster, which is able to be fixed in place so as face toward input rod 22. In a second region of the electromechanical brake booster, which is able to be fixed in place so as to face toward output rod 24, continuous receiving opening 16 of booster housing 12 preferably exhibits play between booster housing 12 and valve element 14. The position of valve element 14 with respect to booster housing 12 thus is radially variable in relation to braking axis 10 adjacently to output rod 24. Contact between components 12 and 14 is ensured at the same time because of formations 50 and 52.

The afore-discussed advantages of the electromechanical brake booster are ensured also in a brake system equipped with such a brake booster. Because a realization of the advantages does not require any particular design of the brake system, no examples of a brake system equipped with the electromechanical brake booster will be described here.

Figure 2:
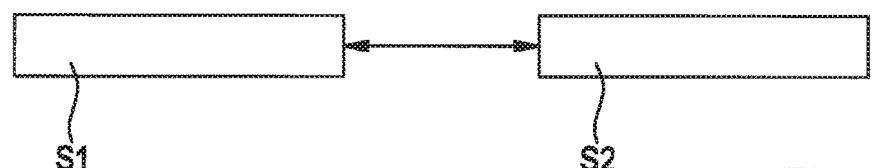
FIG. 2 shows a flow chart for elucidating one specific embodiment of the method for installing an electromechanical brake booster on and/or in a brake system for a vehicle.

FIG. 2 shows a flow chart for elucidating a specific embodiment of the method for installing an electromechanical brake booster on and/or in a brake system for a vehicle.

The method includes at least one method step S1 and one method step S2. In method step S1, a booster housing of the electromechanical brake booster is installed. In method step S2, a valve element of the electromechanical brake booster is installed, the valve element being placed in a continuous receiving opening of the booster housing in a manner that allows an adjustment in relation to the booster housing. In addition, a ball segment disposed or developed on the valve element is brought into contact with a conical seat of a disk of the electromechanical brake booster, said disk being situated between the ball segment and the booster housing such that it is able to move in relation to the booster housing.

The method steps S1 and S2 may be executed in any sequence or simultaneously. At least some components of the afore-described electromechanical brake booster may be used for executing method steps S1 and S2, for example. However, it is pointed out that the executability of the method is not restricted to the use of these components. In addition, it is reiterated that the method for installing an electromechanical brake booster is able to be executed on a multiplicity of different types of brake systems.

What is claimed is:

1. An electromechanical brake booster for a brake system of a vehicle, comprising:
   a booster housing; and
   a valve element, wherein:
   (i) the valve element is situated in a continuous receiving opening of the booster housing so as to allow an adjustment in relation to the booster housing;
   (ii) the valve element has a central opening within which a valve piston is positioned such that the valve piston is adjustable in relation to the valve element, a driver-applied brake force being transmittable from an input rod provided at a first end of the valve piston to an output rod positioned at a second end of the valve piston; and
   (iii) a ball segment is situated on the valve element, the ball segment contacting a conical seat of a disk of the electromechanical brake booster, the disk being disposed between the ball segment and the booster housing so as to be adjustable in relation to the booster housing.

2. The electromechanical brake booster as recited in claim 1, wherein the valve element has a step between a first subsection configured to be positioned in the continuous receiving opening and a second subsection which projects from the continuous receiving opening in the direction of the output rod, and wherein the ball segment is situated on a surface of the step facing away from the output rod.

3. The electromechanical brake booster as recited in claim 2, wherein the disk is situated within a receiving bore provided on the booster housing.

4. The electromechanical brake booster as recited in claim 2, wherein the valve element and the ball segment are formed in one piece.

5. The electromechanical brake booster as recited in claim 2, wherein the output rod is a rigid output rod.

6. The electromechanical brake booster as recited in claim 2, wherein at least one of:
   (i) the ball segment is made from plastic; and
   (ii) the disk is made from at least one of plastic and steel.

7. The electromechanical brake booster as recited in claim 2, wherein an outer surface of the valve element facing toward the booster housing has at least one indentation, which is guided along a guide situated at the continuous receiving opening of the booster housing.

8. The electromechanical brake booster as recited in claim 7, wherein the at least one indentation and the guide are provided in a first region of the electromechanical brake booster which is fixed in place so as to face toward the input rod, and the continuous receiving opening of the booster housing exhibits play between the booster housing and the valve element in a second region of the electromechanical brake booster which is fixed in place so as to face toward the output rod.

9. A method for installing an electromechanical brake booster in a brake system for a vehicle, comprising:
   installing a booster housing and a valve element of the electromechanical brake booster, the valve element being positioned in a continuous receiving opening of the booster housing such that the valve element is adjustable in relation to the booster housing; and
   contacting (i) a ball segment which situated on the valve element with (ii) a conical seat of a disk which is situated between the ball segment and the booster housing so as to allow an adjustment of the disk in relation to the booster housing.

* * * * *